United States Patent [19]

Gallagher et al.

[11] 4,210,739
[45] Jul. 1, 1980

[54] INTERNALLY PLASTICIZED VINYL CHLORIDE COPOLYMER COMPOSITION

[75] Inventors: Ruth E. Gallagher, Dobbs Ferry; Jagadish C. Goswami, New City; Paul Kraft, Spring Valley, all of N.Y.; Arthur J. Yu, Stamford, Conn.

[73] Assignee: Stauffer Chemical Company, Westport, Conn.

[21] Appl. No.: 926,773

[22] Filed: Jul. 21, 1978

Related U.S. Application Data

[63] Continuation of Ser. No. 795,990, May 11, 1977, abandoned, which is a continuation of Ser. No. 610,910, Sep. 5, 1975, abandoned.

[51] Int. Cl.² .............. C08F 214/06; C08F 220/18
[52] U.S. Cl. .................... 526/325; 260/18 PF; 560/204
[58] Field of Search ........................................ 526/325

[56] References Cited

U.S. PATENT DOCUMENTS

| | | | |
|---|---|---|---|
| 2,845,404 | 7/1958 | Garner et al. | 526/325 |
| 2,958,668 | 11/1960 | Carr et al. | 526/325 |
| 3,017,396 | 1/1962 | Arond et al. | 260/78.5 |
| 3,019,208 | 1/1962 | Reid et al. | 260/45.5 |
| 3,027,358 | 3/1962 | Ebersbach et al. | 526/325 |
| 3,068,210 | 12/1962 | Douglas | 260/78.5 |
| 3,196,133 | 7/1965 | Piloni et al. | 526/325 |
| 3,219,729 | 11/1965 | Meyers et al. | 526/325 |
| 3,544,661 | 12/1970 | Oth et al. | 260/879 |
| 3,558,566 | 11/1971 | Balwe et al. | 526/321 |
| 3,640,927 | 2/1972 | Marvel et al. | 260/875 |

FOREIGN PATENT DOCUMENTS

1388315  3/1975  United Kingdom .

OTHER PUBLICATIONS

Encyclopedia of PVC, Nass, L. I., pp. 126–128 (1976).
Polymer Eng. and Sci., 9, No. 2, pp. 86–89 (Mar. 1969).
A.C.S. Advances in Chem. Series, No. 48, pp. 2, 88, 89, 143–145 (1965).

*Primary Examiner*—Stanford M. Levin
*Attorney, Agent, or Firm*—Richard P. Fennelly

[57] ABSTRACT

An internally plasticized vinyl chloride copolymer composition having good low temperature flexibility and tensile properties is disclosed. It consists essentially of from about 45% to about 80%, by weight, vinyl chloride, from about 15% to about 54%, by weight, of a $C_2$–$C_{10}$ alkyl acrylate, and from about 1% to about 15%, by weight, of one or more $C_8$–$C_{22}$ dialkyl maleate and/or fumarate. The copolymer is formed using conventional suspension, emulsion, bulk and solution polymerization procedures.

17 Claims, No Drawings

INTERNALLY PLASTICIZED VINYL CHLORIDE COPOLYMER COMPOSITION

This is a continuation of U.S. application Ser. No. 795,990, filed May 11, 1977, now abandoned, which in turn was a continuation of U.S. application Ser. No. 610,910, filed Sept. 5, 1975, also now abandoned.

TECHNICAL DESCRIPTION OF THE INVENTION

The present invention relates to an internally plasticized vinyl chloride copolymer which can be used in those applications where externally plasticized vinyl chloride is used, e.g., as a vinyl film or sheeting material, in vinyl wire and cable insulation, as vinyl flooring, and as bag and tubing for blood transfusion equipment.

Externally plasticized vinyl chloride polymers are well known. These products typically contain certain levels of external plasticizer to give the polymers the required degree of flexibility. The technique of external plasticization is not, however, entirely satisfactory since the plasticizer tends to migrate to the surface of the finished product giving rise to such problems as surface stickiness, gradual loss of plasticity, and the danger of possible toxicological dangers to the user from the plasticizer. Also, the aromatic plasticizers used in such products give rise to copious smoke production when burned and flex at rather high temperatures requiring a rather high energy input during processing.

A number of prior art processes have been proposed for formation of internally plasticized vinyl chloride copolymer. The use of copolymers of a vinyl monomer and a polymerizable polyester, for example, an acrylate or a vinyl ester of a polyester of an aliphatic hydroxycarboxylic acid, was proposed in U.S. Pat. No. 3,640,927 to C. S. Marvel et al. An internally plasticized two-component vinyl chloride copolymer containing from about 75% to about 95% vinyl chloride and about 25% to about 5% of an ester of an unsaturated mono- or polycarboxylic acid, e.g., a $C_6$–$C_{12}$ alkyl maleate, fumarate or acrylate, was proposed in U.S. Pat. No. 3,544,661 to A. Oth et al. The present invention relates to a composition containing at least three basic components. Finally, a four component polymer composition containing vinyl chloride, a dialkyl maleate or fumarate, an alkyl ester of acrylic or methacrylic acid and a monohydrogen, monoalkyl maleate or fumarate was proposed in U.S. Pat. No. 3,196,133 to R. A. Piloni et al. for use as a solvent-based coating having both good adhesiveness and flexibility. The Piloni et al. composition utilizes a lower molecular weight $C_1$–$C_{10}$ dialkyl maleate or fumarate as one component whereas the present invention contemplates use of the $C_8$–$C_{22}$ dialkyl maleates and fumarates.

A plasticized polyvinyl chloride composition must have low temperature flexibility and physical toughness to be commercially useful. The low temperature flexibility can be measured by the well known Clash-Berg method with a value of −25° C. or lower being preferred. Physical toughness can be determined by measuring the tensile strength at break with a value of about 1200 psi or higher being desired. Standard ASTM tests exist for both of the above determinations, for example, ASTM D1043 and ASTM D638-72, respectively.

It is theorized that conventional external plasticization partially reduces the crystallinity of the vinyl chloride polymer thereby achieving better low temperature flexibility but leaving enough crystallinity so as not to reduce the physical toughness of the polymer. Internally plasticized vinyl chloride copolymers, on the other hand, frequently reduce the crystallinity of the polymer to substantially zero if a high enough amount of plasticizing comonomers are used. It was suggested by R. Liepins in "Polymer Engineering and Science,"'Vol. 9, No. 2 (March 1969), pp. 86–89 that a possible solution to this problem is the use of high molecular weight plasticizing comonomers so that the mole fraction of such comonomers is low whereas their weight percentage is high. Although such comonomers as the $C_8$–$C_{22}$ dialkyl fumarates and maleates meet this description, their use with vinyl chloride monomer does not give a vinyl chloride copolymer having the desired low temperature flexibility and adequate physical properties, e.g., good tensile strength. As will be shown in Examples which follow, use of such comonomers as the high molecular weight dialkyl fumarates and maleates, or for that matter, the high molecular weight alkyl acrylates, will produce a product having the desired low temperature flexibility but having other physical properties not suitable for the intended product, e.g., unacceptably low tensile strength.

It has been unexpectedly found that an internally plasticized vinyl chloride polymer having a Clash-Berg value of about −20° C. or below, perferably −25° C. or below, and a tensile strength at break of at least 850 psi or higher, preferably 1200 psi or greater, can be formed with conventional emulsion, suspension, bulk and solution polymerization procedures by using a basic three component monomer charge which contains certain amounts of vinyl chloride, a $C_2$–$C_{10}$ alkyl acrylate and a $C_8$–$C_{22}$, preferably a $C_{11}$–$C_{22}$, dialkyl maleate or fumarate. The invention is an internally plasticized copolymer which consists essentially of from about 45% to about 80%, by weight, of vinyl chloride, from about 15% to about 54%, by weight, of a $C_2$–$C_{10}$ alkyl acrylate, and from about 1% to about 15%, by weight, of a $C_8$–$C_{22}$ dialkyl maleate or fumarate copolymerized therein. Mixtures of the respective alkyl acrylates and of the dialkyl maleates of fumarates can be used, if desired. A preferred copolymer is a terpolymer containing from about 60% to about 75%, by weight vinyl chloride, from about 20% to about 35%, by weight of the $C_2$–$C_{10}$ alkyl acrylate, and from about 4% to about 15% of the $C_8$–$C_{22}$ dialkyl maleate or fumarate copolymerized therein.

Representative $C_2$–$C_{10}$ alkyl acrylates which can be used in the practice of the present invention include ethyl acrylate, n-propyl acrylate, isopropyl acrylate, n-butyl acrylate, sec-butyl acrylate, t-butyl acrylate, n- and other isomeric pentyl acrylates, n-hexyl acrylate, cyclohexyl acrylate, n-octyl acrylate, 2-ethyl hexyl acrylate, and mixtures of the foregoing acrylates.

The $C_8$–$C_{22}$ dialkyl maleates and fumarates suitable for use in the present invention can be formed, if desired, by reacting a mixture of $C_8$–$C_{22}$ aliphatic alcohols, e.g., a mixture of $C_{12}$–$C_{22}$ alcohols, which are available commercially as Conoco LTD alcohol from Continental Oil Co., with either maleic anhydride or fumaric acid, as, for example, set forth in Example 1 given below. Alternatively, individual $C_8$–$C_{22}$ dialkyl maleates or fumarates can be utilized. Representative maleates and fumarates which can be used include di-2-ethylhexyl maleate and fumarate, diundecyl maleate and fumarate, didodecyl maleate and fumarate, and ditridecyl maleate and fumarate, dioctadecyl maleate and fumarate, and didocosa maleate and fumarate and mixtures thereof. The mixed maleates or fumarates can be made by mixing the separately prepared dialkyl esters or by mixing the alcohols together and then running the esterification reaction.

The copolymer of the present invention can be formed using conventional bulk, emulsion, suspension and solution polymerization procedures. Suspension polymerization is preferred since it avoids the problems of isolation of the product from a latex that can be encountered using emulsion polymerization techniques, the heat of reaction is more readily removed as compared to bulk polymerization procedures, and no solvent recovery is needed as in solution polymerization.

Suspension polymerization reaction mixtures comprise from about 20% to about 45%, by weight, based on the amount of water, of the above enumerated monomers in an aqueous reaction medium. Also included will be from about 0.05% to about 5%, by weight based on the weight of monomers, of a suspending agent, such as methyl cellulose, hydroxyethyl cellulose, hydroxypropyl methyl cellulose, gelatine, and the like; from about 0.005% to about 1%, by weight, based on the amount of monomer, of at least one monomer-soluble initiator, such as azobisisobutyronitrile, lauroyl peroxide, benzoyl peroxide or isopropylperoxy dicarbonate. Polymerization is conducted by heating the suspension containing the above components to a temperature of from about 35° C. to about 75° C. for about 2 to 12 hours with agitation being applied throughout the course of the reaction. As is well known in the art, the use of the more active of the above mentioned initiators will require use of either a lower temperature or shorter reaction time, or both, whereas use of the less active initiators will require more severe conditions.

If emulsion polymerization is to be employed, the above described suspending agent is replaced with from about 0.2% to about 2%, by weight, of an emulsifying agent, such as sodium lauryl sulfate, potassium stearate, an alkyl benzene sulfonate, an ammonium dialkyl sulfosuccinate, and the like, and the monomer soluble initiator is replaced by from about 0.1% to about 1% of a water-soluble initiator, such as an alkyl metal persulfate, perborate or peracetate, ammonium persulfate, perborate or peracetate, and urea peroxides, hydrogen peroxide, tertiary butyl hydroperoxide and the like. If desired, a redox initiator system such as ammonium persulfate and sodium bisulfite or hydrogen peroxide and ascorbic acid can also be used as the initiator. Polymerization is carried out at similar temperatures and over similar times as those used in suspension polymerization.

If bulk polymerization is employed, the monomers are polymerized in the presence of the above-described amounts of the monomer-soluble catalysts alone under the same temperature and time conditions described above in connection with suspension and emulsion polymerization.

If solution polymerization is employed, the monomers are polymerized in the presence of at least one inert organic solvent, such as butane, pentane, octane, benzene, toluene, cyclohexane, cyclohexanone, acetone, isopropanol, tetrahydrofuran or the like. The selected initiator should be soluble in the reaction medium. The copolymer can either remain dissolved in the solvent at the end of the polymerization or can precipitate from the liquid phase during the polymerization. In the former case, the product can be recovered by evaporation of the solvent or by precipitation of the polymer solution by combining it with a non-solvent for the product. The same reaction conditions used in suspension and emulsion polymerization can be used.

The final product of the present invention can contain, if desired, various optional additives which are compatible with the copolymer product and which do not adversely affect the properties of said product. Included within this class of additives are those heat and light stabilizers, ultraviolet stabilizers, pigments, fillers, dyes, and other additives known to persons of ordinary skill in the art. A suitable listing of possible additives which a person of ordinary skill in the art may use to select appropriate additives, if desired, is given in Modern Plastics Encyclopedia, Vol. 51, No. 10A, e.g., at pp. 735–754.

The following Examples illustrate certain preferred embodiments of the present invention:

EXAMPLE 1

This example illustrates a procedure for preparing an alkyl ester of fumaric acid which is suitable for use in preparing the copolymer composition of this invention.

The reactants listed below were placed in a three liter round bottomed flask equipped with a Dean & Stark trap, condenser, stirrer, thermometer and nitrogen inlet:

| Reagent | Amount |
| --- | --- |
| Mixture of alcohols* | 744 g. |
| Fumaric acid | 174 g. |
| p-toluene sulfonic acid** | 2 g. |
| Butylated hydroxytoluene** | 0.02 g. |
| Varnish and Paint Makers Naphtha** | 300 ml. |

*available commercially as Conoco LTD alcohol from Continental Oil Co. It comprises a mixture of $C_{12}$—$C_{22}$ branched chain alcohols having an average molecular weight of 248.
**the sulfonic acid is used as an esterification catalyst; the toluene reagent, as a polymerization inhibitor; and the naphtha as an azeotroping agent.

The reactants were heated and stirred at a temperature of 110°–160° C. for about 3–5 hours, and 50 ml. of water was removed as an azeotrope. The reactants were then heated with a nitrogen purge at a temperature of from 180° C. to 220° C. to remove the naphtha. The oily product which was obtained was washed with a 5% by weight, solution of sodium hydroxide followed by water washings until the water was neutral by litmus paper testing. The yield was 836 g. of 96% of theory, and the product had a molecular weight of 570. This product was designated "Product A."

EXAMPLE 2

This example illustrates a procedure for preparing a vinyl chloride/fumarate ester/acrylate terpolymer composition in accordance with the present invention. The fumarate ester was prepared by the procedure set forth in Example 1.

The reactants listed below were placed in a one-quart soda bottle which was then frozen at −15° C. for two hours:

| Reagent | Amount |
| --- | --- |
| Water | 300 g. |
| Hydroxypropylmethyl cellulose (1% soln.)* | 35 g. |
| 2-ethylhexyl acrylate | 30 g. |
| "A" from Example 1 | 5 g. |

*a suspending agent from Dow; Methocel K-35.

molded and die cut. Each was then treated by a variety of ASTM methods. The results are shown in Table 2:

TABLE 2

| Sample: | 1 | 2 | 3 | 4 | 5 | 6 | 7 | 8 | 9* |
|---|---|---|---|---|---|---|---|---|---|
| Clash-Berg (T$_f$), °C. | −30 | −19 | −11 | −48 | −32 | −24 | −32 | −24 | −38 |
| Shore "A" Hardness (10 sec.) | 69 | 83 | 95 | 75 | 61 | 72 | 34 | 59 | 76 |
| Tangent Modulus of Elasticity (psi) | 1070 | 2460 | 14,800 | 7320 | 820 | 1280 | 210 | 550 | 1190 |
| Tensile Strength at Break (psi) | 1272 | 1933 | 1289 | 275 | 866 | 1681 | 687 | 1353 | 2905 |
| % Elongation at Break | 247 | 147 | 187 | 0 | 347 | 236 | 511 | 335 | 587 |
| Secant Modulus | 551 | 1492 | 1252 | 214 | 439 | 977 | 122 | 520 | 846 |

*not made in Example 2. It was externally plasticized PVC suspension resin containing 5 phr of C-62 stabilizer and 55 phr 6, 10-phthalate.

The externally plasticized PVC (Sample 9) showed good low temperature flexibility, as measured by its Clash-Berg reading, and good tensile properties. The vinyl chloride/$C_8$ fumarate copolymer (Sample 3) was lacking in both low temperature flexibility and elasticity, the vinyl chloride/$C_{12}$–$C_{22}$ fumarate copolymer (Sample 4) had excellent low temperature flexibility but was very poor in tensile strength, and the vinyl chloride/acrylate copolymer (Sample 2) was somewhat deficient in low temperature flexibility and % elongation at break. Sample 5 which contains 10% or more of a fumarate ester is excellent in low temperature flexibility if a reduction of the tensile strength at break to about 850 to 900 psi can be tolerated. Samples 1, 6 and 8, which are the preferred compositions of this invention had a Clash-Berg value of −24° F. or lower, a tensile strength at break of 1200 psi or higher, and a % elonga- To this chilled bottle was then added 2.5 ml. of a 10%, by weight, solution of isopropylperoxydicarbonate initiator in heptane and 65 g. of vinyl chloride monomer. The bottle was capped and was clamped in a bottle polymerization apparatus which was then rotated at 35 rpm with heating at 45° C. for 12 hours. After cooling to room temperature the bottle was vented and no unreacted vinyl chloride monomer was detected. The product, a white suspension slurry, was filtered through a Buchner funnel and was dried.

Using a similar procedure a number of other samples were also made along with other copolymer compositions for comparison. Table 1 sets forth the results:

TABLE 1

| Sample | Charged Composition* | % Cl | Final Composition** | Rel. Visc.*** |
|---|---|---|---|---|
| 1 | 65 VC/30 EHA/5 Product A | 36.0 | 65 VC/36.5 (F + A) | 3.24 |
| 2 t | 70 VC/30 EHA | 36.6 | 64.6 VC/35.4 EHA | 3.53 |
| 3 t | 70 VC/30 EHF | 37.7 | 66.6 VC/33.4 EHF | 1.92 |
| 4 t | 65 VC/35 Product A | 37.0 | 65.3 VC/34.7 F-570 | 1.73 |
| 5 | 65 VC/25 EHA/10 Product A | 35.4 | 68.4 VC/37.6 (F + A) | 2.72 |
| 6 | 65 VC/30 EHA/5 $C_{13}$ fumarate | 37.1 | 65.5 VC/34.5 (A + F) | 3.24 |
| 7 t | 50 VC/35 EHA/15 DBF | — | — | — |
| 8 | 65 VC/30 EHA/5 EHF | 34.8 | 61.4 VC/38.6 (F + A) | 2.69 |

*VC = vinyl chloride monomer; EHA = 2-ethylhexyl acrylate; EHF = 2-ethylhexyl fumarate; "A" = the fumarate ester of Example 1; DBF = dibutyl fumarate.
**F + A = fumarate + acrylate component; EHA and EHF have the same meanings given above. Using chlorine analysis one can only determine the % polyvinyl chloride. The remainder is the fumarate and acrylate content.
***as a 1%, by weight, solution of the polymer in cyclohexanone at 25° C. t for comparison, not part of the present invention. Samples 2, 3 and 4 are two component copolymers of vinyl chloride and a fumarate whereas sample 7 is a three component vinyl chloride/acrylate/fumarate ester copolymer containing a fumarate ester having a molecular weight which is too low.

EXAMPLE 3

One hundred grams of each of the samples listed in Table 1 in Example 2 were mixed with the following ingredients:

| Ingredient | Amount (g.) |
|---|---|
| Epoxy stabilizer (G-62, a soybean oil epoxide, sold by Rohn and Haas) | 5 |
| Barium-Cadmium Stabilizer (Nuostabe V-1541, sold by Tenneco Chemicals, Inc.) | 1.5 |
| Phosphite stabilizer (Nuostabe V-1542, sold by Tenneco Chemicals, Inc.) | 1.5 |
| Calcium stearate lubricant | 0.5 |
| Stearic acid lubricant | 0.5 |

The samples were each processed on a 2 roll mill at 270° F.–300° F. for 7–10 minutes and were compression tion at break of at least 230% or higher. Commercially useful, flexible vinyl products can be made using these resin compositions which contain no migratory plasticizers. These products will avoid the aforementioned problems normally associated with plasticizer migration from externally plasticized PVC films.

The product of the present invention is, therefore, an internally plasticized composition which does not possess the surface stickiness, gradual loss of plasticity, danger of possible toxicological dangers to the user from the plasticizer, and copious smoke production when burned that are characteristics of certain externally plasticized products known to the prior art. In addition, the product of the present invention flexes at a lower temperature than conventional externally plasticized products thereby requiring a lower energy input for such fabrication techniques as milling and the like.

The foregoing illustrates certain preferred embodiments of the claimed invention. The scope of protection which is sought is set forth in the claims which follow.

What is claimed is:

1. An internally plasticized copolymer consisting of:
   (1) from about 45% to about 80%, by weight, of vinyl chloride;
   (2) from about 15% to about 54%, by weight, of a $C_2$–$C_{10}$ alkyl acrylate; and
   (3) from about 1% to about 15%, by weight, of a $C_8$–$C_{22}$ dialkyl maleate or fumarate, or mixtures thereof.

2. A copolymer as claimed in claim 1 wherein the vinyl chloride is from about 60% to about 75%, by weight.

3. A copolymer as claimed in claim 1 wherein the $C_2$–$C_{10}$ alkyl acrylate is about 20% to about 35%, by weight.

4. A copolymer as claimed in claim 1 wherein the $C_8$–$C_{22}$ dialkyl maleate or fumarate or mixtures thereof is from about 4% to about 15%, by weight.

5. A copolymer as claimed in claim 1 wherein the alkyl acrylate is 2-ethylhexyl acrylate.

6. A copolymer as claimed in claim 1 wherein (3) is a mixture of $C_{12}$–$C_{22}$ dialkyl fumarates.

7. A copolymer as claimed in claim 1 wherein the vinyl chloride is from about 60% to about 75%, by weight, where the $C_2$–$C_{10}$ alkyl acrylate is from about 15% to about 54%, by weight, and where the maleate, fumarate or mixture thereof is from about 4% to about 15%, by weight.

8. A copolymer as claimed in claim 7 wherein the acrylate is 2-ethylhexyl acrylate.

9. A copolymer as claimed in claim 7 wherein (3) is a mixture of $C_{12}$–$C_{22}$ dialkyl fumarates.

10. A copolymer as claimed in claim 8 wherein (3) is a mixture of $C_{12}$–$C_{22}$ dialkyl fumarates.

11. An internally plasticized copolymer consisting of:
    (1) from about 45% to about 80%, by weight, of vinyl chloride;
    (2) from about 15% to about 54%, by weight, of a $C_2$–$C_{10}$ alkyl acrylate; and
    (3) from about 1% to about 15%, by weight, of a $C_8$–$C_{22}$ dialkyl fumarate or mixture thereof.

12. A copolymer as claimed in claim 11 wherein the vinyl chloride is from about 60% to about 75%, by weight.

13. A copolymer as claimed in claim 11 wherein the $C_2$–$C_{10}$ alkyl acrylate is about 20% to about 35%, by weight.

14. A copolymer as claimed in claim 11 wherein the $C_8$–$C_{22}$ dialkyl fumarate or mixture thereof is from about 4% to about 15%, by weight.

15. A copolymer as claimed in claim 11 wherein the alkyl acrylate is 2-ethylhexyl acrylate.

16. A copolymer as claimed in claim 11 wherein the vinyl chloride is from about 60% to about 75%, by weight, wherein the $C_2$–$C_{10}$ alkyl acrylate is from about 15% to about 54%, by weight, and wherein the fumarate or mixture thereof is from about 4% to about 15%, by weight.

17. A copolymer as claimed in claim 16 wherein the acrylate is 2-ethylhexyl acrylate.

* * * * *

UNITED STATES PATENT AND TRADEMARK OFFICE
CERTIFICATE OF CORRECTION

PATENT NO. : 4,210,739
DATED : July 1, 1980
INVENTOR(S) : Ruth E. Gallagher et al.

It is certified that error appears in the above-identified patent and that said Letters Patent are hereby corrected as shown below:

Col. 1, line 33, "copolymer" should be -- copolymers --;

Col. 3, line 43, "alkyl" should be -- alkali --;

Col. 3, line 45, "and" should be -- the --;

Col. 4, line 49, "of" before "96%" should be -- or --;

Col. 5, Table 1, under the heading "Final Composition**", sample 5, "68.4" for the vinyl chloride content should be 62.4 --;

Col. 5, line 60, "Rohn and Haas" should be -- Rohm and Haas --;

Col. 6, line 1, "treated" should be -- tested --;

Col. 6, Table 2, Left Hand Column, "Secant Modulus" should be -- Secant Modulus at 100% Elongation --; and Col. 6, Table 2, in the footnote, "C-62" should be -- G-62 --.

Signed and Sealed this

Fourteenth Day of October 1980

[SEAL]

Attest:

SIDNEY A. DIAMOND

Attesting Officer

Commissioner of Patents and Trademarks